May 16, 1939.　　C. A. HIRSCHBERG　　2,158,120
DETACHABLE DRILL BIT
Filed Feb. 19, 1936　　3 Sheets-Sheet 1
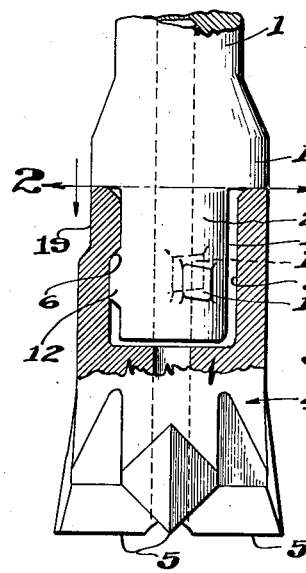
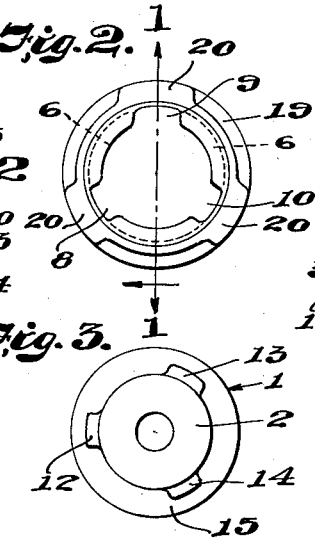
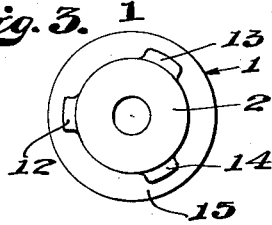
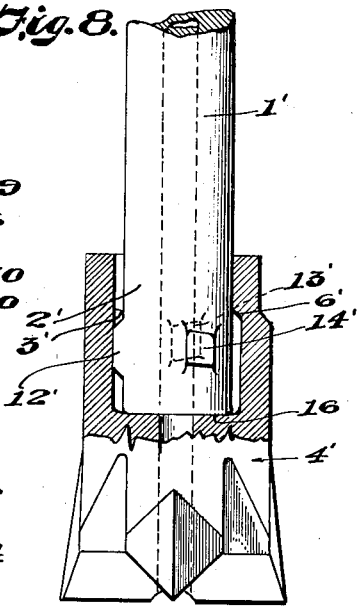
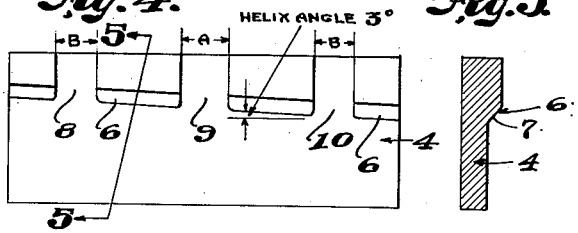
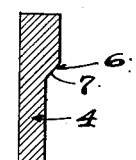
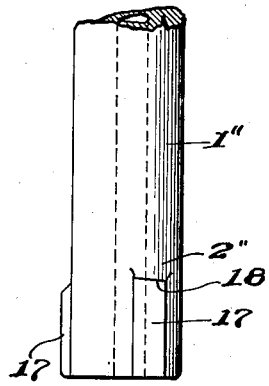
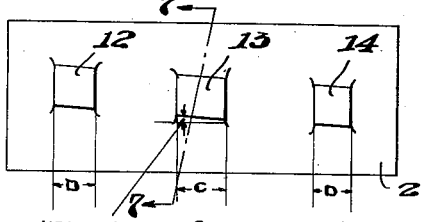
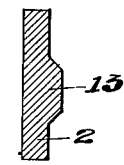
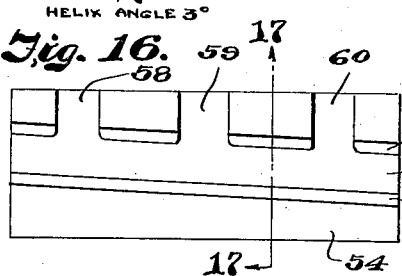
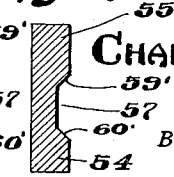
CHARLES A. HIRSCHBERG.
INVENTOR
BY
ATTORNEY

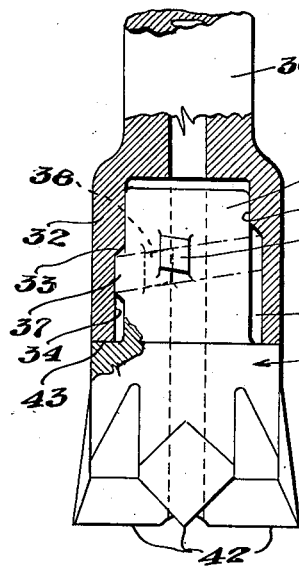
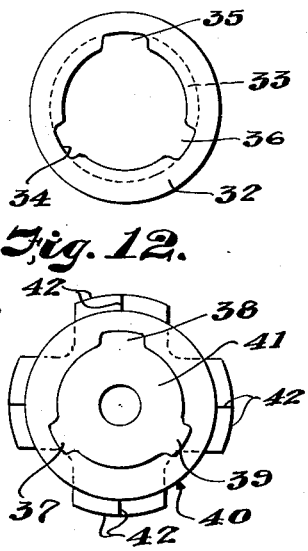
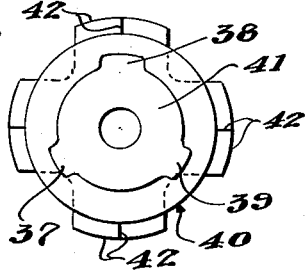
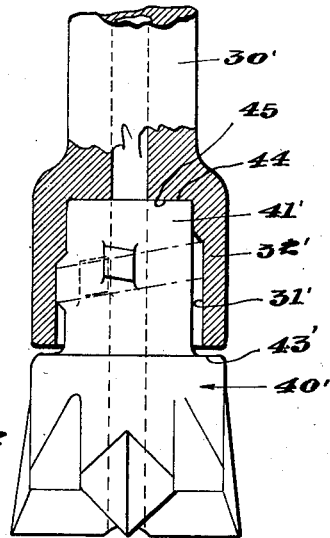
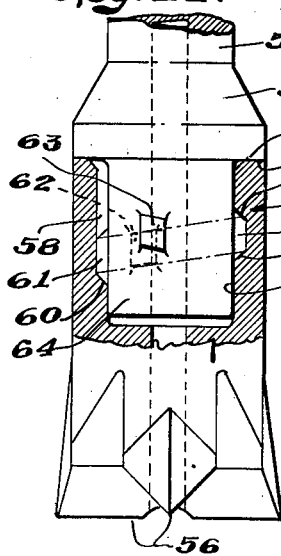
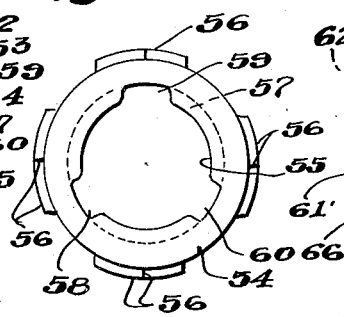
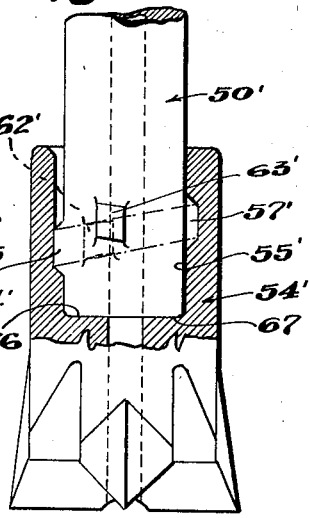

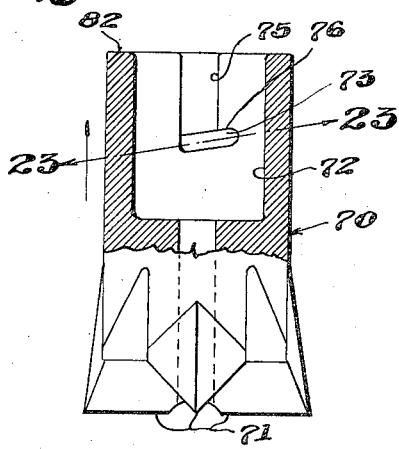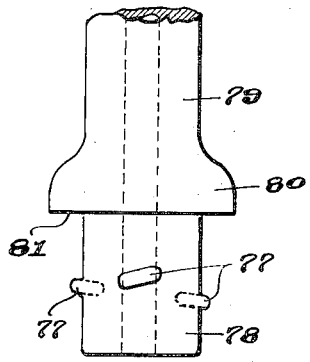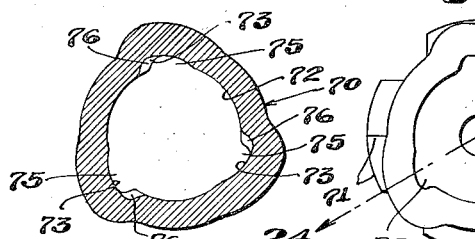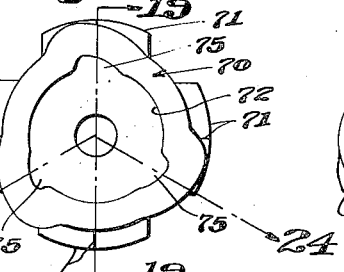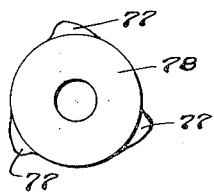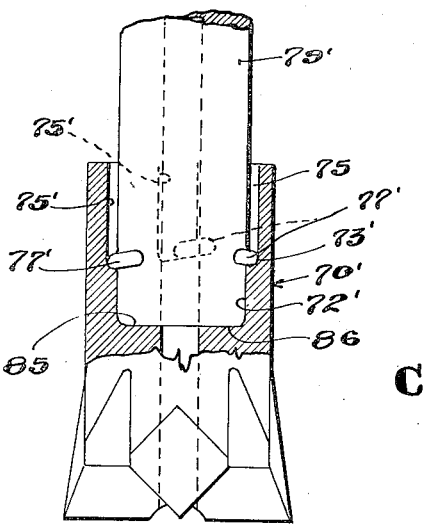

Patented May 16, 1939

2,158,120

UNITED STATES PATENT OFFICE 2,158,120

DETACHABLE DRILL BIT

Charles A. Hirschberg, Mountain Lakes, N. J.

Application February 19, 1936, Serial No. 64,788

2 Claims. (Cl. 255—63)

This invention relates to drill bits for use in connection with percussive tools and more particularly to detachable drill bits which may be removably attached to a shank drill steel bar, for replacement when they become dulled or worn. The primary object of the present invention is to provide a detachable drill bit as specified which is simple in construction, may be manufactured at a low cost, and one which may be easily, quickly and securely attached to a shank or drill steel without the assistance of any tools.

Another and important object of the present invention is to provide a detachable drill bit which may be forged or formed from lengths of broken or discarded drill steel, and one which lends itself to ready manufacture at the place where it is to be used, or in centralized shops on large projects, much in the same arrangement that drill steels are now sharpened, thereby permitting the user to make the bits as he needs them and eliminating the necessity of tying up large sums of money in a stock of drill bits so as to insure the availability of bits as they are needed.

A further object of the present invention is to provide a detachable drill bit embodying simple, easily connected means for connecting the bit to the shank or drill bar, which means provides a firm multiple point solid connection that is not affected by the blows of the hammer drill and consequently permits easy disconnection of the bit and shank when desired.

With these and other objects in view, as may appear from the accompanying specification, the invention consists of various features of construction and combination of parts, which will be first described in connection with the accompanying drawings, showing a detachable drill bit of the preferred form embodying the invention, and the features forming the invention will be specifically pointed out in the claims.

In the drawings:

Fig. 1 is a view partly in section and partly in elevation of the improved detachable drill bit showing it connected to a shank or drill bar taken on the line 1—1 of Fig. 2.

Fig. 2 is a top plan of the detachable bit taken on the line 2—2 of Fig. 1.

Fig. 3 is an end view of the shank by means of which the bit is connected to the bar or drill steel.

Fig. 4 is a diagrammatic plan or diagrammatic development of the drill bit showing the helical groove and slots to permit the insertion of the shank into the socket.

Fig. 5 is a section taken on the line 5—5 of Fig. 4.

Fig. 6 is a diagrammatic plan or development of the inserting end or shank of the drill steel or drill bar.

Fig. 7 is a section taken on the line 7—7 of Fig. 6.

Fig. 8 is a view partly in section and partly in side elevation of a modified form of the detachable drill bit structure illustrating the type wherein the end of the drill bar fits flush against the inner end of the socket in the detachable bit.

Fig. 9 is a fragmentary side elevation of a slight modification in the form of the drill bar or steel and showing splines instead of lugs thereon for connecting the shank to the detachable drill bit.

Fig. 10 is a view partly in section and partly in side elevation of a modified form of the detachable drill bit showing a construction wherein the socket is formed on the drill bar and the shank on the drill bit.

Fig. 11 is an end view of the drill bar looking into the socket.

Fig. 12 is an end view of the bit looking at the end of the shank.

Fig. 13 is a view partly in side elevation and partly in section of a modified form of the type of drill bit illustrated in Figs. 10 to 12 inclusive.

Fig. 14 is a view partly in side elevation and partly in section of a still further modified form of the detachable drill bit structure.

Fig. 15 is an end view of the socket end of the drill bit shown in Fig. 14.

Fig. 16 is a development plan of the socket of the form of drill bit shown in Figs. 14 and 15.

Fig. 17 is a section taken on the line 17—17 of Fig. 16.

Fig. 18 is a view partly in section and partly in elevation of a further modification of the type of drill bit shown in Figs. 14 and 15.

Fig. 19 is a section through a still further modified form of the drill bit taken on the line 19—19 of Fig. 20.

Fig. 20 is a top plan of the modified form of bit shown in Fig. 19.

Fig. 21 is a side elevation of the shank for fitting in the modified form of drill bit shown in Fig. 19.

Fig. 22 is an end view of the shank shown in Fig. 21.

Fig. 23 is a cross section taken on the line 23—23 of Fig. 19.

Fig. 24 is an assembled view partly in side elevation and partly in section of a modified form of the structure shown in Figs. 19 to 23 inclusive.

Referring more particularly to the drawings and considering first the preferred form of the invention illustrated in Figs. 1 to 7 inclusive, the detachable drill bit comprises the drill bar or drill steel 1 which has a shank 2 formed thereon for insertion into the socket 3 formed in the detachable drill bit 4 and extending inwardly thereinto from the end of the bit on which the cutting edges 5 are formed. The detachable drill bit 4 has a helical shoulder 6 formed therein a predetermined distance inwardly of the open end of the socket 3 and the face of this shoulder 6 is inclined as shown at 7. However, it may be substantially horizontal or at any other angle than that shown in the drawings, if desired, without departing from the spirit of the present invention.

The helical shoulder 6 which is annular, is interrupted at circumferentially spaced points by slots or grooves 8, 9 and 10, which extend inwardly longitudinally of the drill bit from the mouth of the socket 3 to the inner end of the shoulder 6, forming in effect, as clearly illustrated in the development plan shown in Fig. 4, a plurality of projections extending into the socket 3 at circumferentially spaced points on the lower ends of which projections the angular shoulders 6 are formed.

The shank 2 has lugs 12, 13, and 14 formed thereon at circumferentially spaced points which are just slightly narrower than the widths of the slots or grooves 8, 9 and 10, so that they may be moved downwardly through the grooves into the socket 3 to a point below or inwardly of the helical shoulder 6. After they are so inserted the drill bit 4 is given a partial turn to move the lugs beneath the respective sections of the shoulder.

In the form illustrated in Fig. 1, the drill bar or steel 1 has an annular collar 15 formed thereon which fits tightly against the upper end of the bit 4 and transmits the blow of the hammer engine (not shown) to the bit. By provision of the helical substantially annular shoulder 6 and by the inclining of the ends of the lugs 12, 13, and 14 to correspond to the helix angle of the shoulder 6, the collar 15 will be tightly clamped against the end of the bit 4 when the bit 4 is rotated after the shank 2 has been inserted the proper distance into the socket 3.

A further advantage of the helical shoulder 6 is that in many drilling projects the drill bit is rotated during the drilling action and therefore by forming the annular shoulder 6 helical and angling it in the proper direction, namely the direction reversely of the direction of rotation of the drill bit, the rotary movement of the drill bit during operation will tend to tighten the bit 4 on the shank 2.

In Figs. 4 and 6, the helix angle of the shoulder 6 and the angle of the ends of the lugs 12, 13 and 14, is illustrated as an angle of three degrees which has been found to be approximately the most practical angle, although it is to be understood that the present invention is not to be limited to an angle of three degrees but may be varied widely within practical practice.

By particular reference to Figs. 2, 3, 4 and 6, it will be noted that the slot or groove 9 and the lug 13, are wider than the slots or grooves 8 and 10, and the lugs 12 and 14. This is provided so that it will be impossible for a user to improperly insert the shank 2 into the socket 3 and will insure the engagement of the respective lugs with the respective parts of the shoulder 6 to provide the tight, firm and solid connection of the bit 4 to the bar or steel 1. Referring particularly to Fig. 4, the width A of the groove 9 will be shown to be greater than the widths B of the grooves 8 and 10, and likewise the width C of the lug 13 in Fig. 6 is shown as being greater than the widths D of the lugs 12 and 14.

In Fig. 8 a modified construction of the detachable drill bit is shown wherein the drill bar or steel 1' is straight and is not provided with a collar corresponding to the collar 15. The lugs 12', 13', and 14' are formed on the end of the bar or steel 1', and they engage against an annular helical shoulder 6' which is identical in construction to the shoulder 6. The only difference between this modified form shown in Fig. 8 and the preferred form shown in Figs. 1 to 7 inclusive, is that when the bit 4' is rotated after the shank of the bar or steel 1' has been inserted into the socket 3', the end of the shank 2' will be forced into engagement with the inner end 16 of the socket 2' for the purpose of transmitting the blows of the hammer engine (not shown) to the bit 4'.

Fig. 9 shows a further modification of the bar or drill steel and in this modification the shank 2" of the bar or steel 1" has splines 17 formed thereon in place of the lugs 12, 13 and 14. The upper ends 18 of the splines 17 are angled to correspond to the helix angle of the shoulders 6 or 6', and this type of shank may be used in connection with the drill bit 4 in lieu of the constructions of shanks shown in Figs. 1 and 8, if it is so desired.

The construction of detachable drill bit shown in Figs. 1 to 8 inclusive, is formed by forging operations and can be forged from suitable lengths or slugs of broken drill steel or discarded drill steel so as to permit an operator to salvage this expensive material which is normally waste and loss to him.

In manufacturing the bits 4 or 4', a proper length of drill steel is heated and the cutting end is forged thereon and while it is still heated the socket is punched in the end of the slug of drill steel, the slug being held in suitable dies so as to control its form after which a suitable die is inserted into the socket and portions of the bit about the socket are forced inwardly as shown at 19 in Figs. 1 and 2 of the drawings. These forced-in portions 19 form the shoulders 6 while the portions 20 which are between the forced-in portions 19, are left in their original normal positions which provides the slots or grooves 8, 9, and 10 by means of which the lugs 12, 13, and 14 are inserted into the socket for engagement against the shoulders 6. After the socket, shoulder 6, and various grooves have been forged into or upon the bit 4, the bit is then cooled and treated in the proper manner to harden it for use.

It will be apparent that these detachable bits which particularly lend themselves to manufacture by forging operations, can be manufactured at a much lower cost than can bits which are machined or require machining operations in their manufacture. Also they can be manufactured at the place where they are to be used or in close proximity thereto, such as in the shops which are now used for sharpening drill steels.

The shank or inserting end of the bar 1 may also be forged in that all that is necessary is first to heat and upset one end of the bar or drill steel 1 or 1' and then reshape it in dies by forging operation to provide either the lugs 12, 13 and 14, and splines 17, and also to either form the collar 15 or leave the shank free from the collar as per the construction shown in Fig. 8 of the drawings.

In Figs. 10 to 13 inclusive, a modification of the improved detachable drill bit is shown and in this construction the arrangement of the shank and socket for connection of the drill bit to the drill steel or bar is reversed from that shown in Figs. 1 to 9 inclusive.

Referring particularly to the construction shown in Figs. 10 to 12 inclusive, the drill steel or bar 30 has a socket 31 formed in the enlarged or upset end 32 thereof, which socket opens out through the end of the bar 30. The socket 31 has an annular helical shoulder 33 formed therein which is substantially the same in construction as the annular helical shoulder 6 formed in the socket 3, and this annular helical shoulder 32 is interrupted at circumferentially spaced points by slots or grooves 34, 35, and 36 which extend inwardly from the open end or mouth of the socket into and through the shoulder 33 to permit insertion of the lugs 37, 38, and 39 into the socket 31 for engagement with the shoulder to detachably connect the drill bit 40 to the drill steel or bar 30. After the shank 41, which is formed on the bit 40, is inserted into the socket 31 a sufficient distance, the drill bit is rotated slightly to move the lugs 37, 38, and 39 out of registration with the grooves or slots 34, 35, and 36 and beneath the shoulder 33 for the purpose of securely connecting the drill bit 40 to the bar or steel 30. The drill bit 40 has any approved type of cutting edges as shown at 42 formed thereon.

As shown clearly in Figs. 11 and 12, the slot or groove 35 and the lug 38 are wider than the slots 34 and 36, and the lugs 37 and 39 so as to insure the proper positioning of the bit 40 with respect to the steel or bar 30 when these two are being connected.

In the construction shown in Fig. 10, the blow-transmitting surface between the bar 30 and the bit 40 is provided by the outer end of the enlarged end portion 32 of the bar 30 having contact with and bearing against the shoulder 43 formed on the bit 40 at the inner terminus of the shank 41, and the modified construction shown in Fig. 13 is in all ways similar to the construction shown in Figs. 10 to 12 inclusive, excepting only as to the point of impact transmitting contact between the bit 40' and the bar or steel 30'.

In the modified construction shown in Fig. 13, the shank 41' is of sufficient length that its outer end 44 contacts with the inner end 45 of the socket 31', while the outer end of the enlarged portion 32' of the bar 30' is free from contact or engagement with the shoulder 43' formed on the bit 40'. In all other respects the construction shown in Fig. 13 is similar to the construction shown in Fig. 10.

Figs. 14 to 18 inclusive show another modification of the construction of the detachable drill bit, and this construction unlike the construction shown in Figs. 1 to 8 inclusive is more particularly adapted to be manufactured by the machining operation instead of by forging although it may be manufactured by forging if so desired. In general principles this modification is similar to the construction shown in Figs. 1 to 8, differing therefrom in particular details which will be hereafter pointed out in the specific description of this form.

In Figs. 14 to 17 inclusive, the drill steel or bar 50 has a collar 51 thereon the outer or underside 52 of which engages against the upper or outer end 53 of the detachable bit 54 to provide the blow or impact contact between the bar 50 and the bit 54.

The bit 54 is provided with a socket 55 which opens out through its upper end and it has cutting edges 56 of any approved type formed on its end opposite to the contact end 53.

The socket 55 has an annular helical groove 57 formed in its side wall intermediate its ends. A plurality of grooves or slots 58, 59, and 60 extend inwardly from the open end of the socket and open out into the annular helical groove 57, as clearly shown in diagrammatic development in Fig. 16 and in Fig. 14. The upper and lower edges 59 and 60 of the groove 57 are shown inclined but they may be made at the incline or bevel shown or in any other desired or beveled manner without departing from the spirit of the present invention. The slots or grooves 58, 59, and 60 permit the insertion of the lugs 61, 62, and 63 into the annular helical groove 57. The various lugs 61, 62, and 63 have their ends shaped to conform to the shape of the edges 59 and 60 of the groove 57 and they fit snugly within this groove for firmly, solidly, and securely connecting the drill bit 54 to the drill steel or bar 50. The lugs 61, 62, and 63 are formed at circumferentially spaced points on the outer surface of the shank 64 which shank is formed on the end of the drill steel or bar 50 and is inserted into the socket 55. The shank 64, and the lugs 61, 62, and 63 formed thereon, are substantially the same in construction and arrangement as the shank 2 and the lugs 12, 13, and 14 which are formed thereon. In fact, the drill bars or steels 50 and 1 may be interchanged for use with either the drill bit 4 or the drill bit 54, the difference in the structure between the type of detachable bit assembly shown in Fig. 1 and that shown in Fig. 14 being in the construction of the detachable bits themselves.

If it is so desired, any one of the slots 58, 59, or 60 and the corresponding lugs 61, 62, or 63 may be made larger than the others, for the purpose of insuring proper positioning of the bit 54 relative to the bar 50 when the two are being connected. In Fig. 15 the slot 59 is shown larger or wider than the slots 58 and 60.

The construction shown in Fig. 18 is just the same as the construction shown in Fig. 14, differing therefrom only in the construction of the drill steel or bar. In Fig. 18 the drill steel or bar 50' does not have an annular collar thereon corresponding to the collar 51 but it is straight and substantially of uniform diameter throughout its length having lugs 61', 62', and 63' formed thereon which correspond to the lugs 61, 62, and 63, and co-operate with the annular helical groove 58' formed in the socket 55' in the detachable bit 54'. In this Fig. 18 the impact transmitting contacting surface engagement between the bar or steel 50' and bit 54' is between the end 66 of the bar or steel 50' and the inner end 67 of the socket 55'.

While in the foregoing description and in the drawings up to and including Fig. 18, three lugs have been shown which co-operate either with the annular helical shoulders or the annular helical groove for connecting the bit and bar or steel, it is to be understood that any practical number of lugs and corresponding slots or grooves may be provided without departing from the spirit of the present invention.

Figs. 19 to 24 inclusive show another or further modification in the construction of the detachable drill bit which, while in certain features is quite similar to and embodies the same generic principles as the bit and shank structures shown in Figs. 1 to 18, inclusive, departs therefrom in respect to the manner of connection of the bit and shank.

This construction is such that it also, like the structure shown in Figs. 1 to 8, inclusive, particularly lends itself to manufacture wholly by forging operations.

In Fig. 19 a detachable bit is shown which may be readily forged from a length or slug of drill steel and this detachable bit 70 has any approved type of cutting edges 71 formed on one end thereof, and also it is provided with an axial socket 72 extending inwardly from the end of the bit opposite to the end upon which the cutting edges 71 is formed. The socket 72 has a plurality of depressions or recesses 73 formed therein at spaced points about its circumference and these depressions are arranged helically, that is, they are disposed at angles to a horizontal plane bi-secting the socket at right angles to the axis thereof, similar or like the helical angle at which the shoulders 6 or groove 57 are disposed.

The depressions or recesses 73 are formed by forging and their walls are curved outwardly from the curvature of the wall of the socket 72 almost tangentially thereto from their entrance ends to their inner or stop ends 74, gradually increasing in depth from their entrance ends towards their inner ends 74. Slots or grooves 75 are formed in the drill bit 70 at circumferentially spaced points about the socket 72 and they are shaped in cross-sectional area like the cross-sectional shape of the depressions or recesses 73. They are not however as wide as the depressions or recesses are long so that the depressions or recesses project to one side of the grooves 75, as clearly shown in Figs. 19 and 23, to provide shoulders 76 against which the lugs 77 formed on the shank 78 engage. The shank 78 is formed on one end of a drill steel or bar 79. The lugs 77 are shaped in plan or cross-sectional area to correspond to the cross-sectional shape of the slots or grooves 75 and the depressions or recesses 73 and they are of substantially the same size as the grooves 75, so that these lugs 77 may pass through the grooves 75 during the insertion of the shank 78 into the socket 72. When the lugs 77 reach the depressions or recesses 73 the bit 70 or the bar or steel 79 are rotated slightly so as to bring the larger ends of the lugs 77 beneath and in engagement with the shoulders 76 to securely connect the bit 70 and the steel or bar 79.

The lugs 77 are eccentric of the outer circular surface of the shank 78 as are the depressions or recesses 73 with respect to the curved wall of the socket 72.

In the construction shown in Figs. 19 to 23 inclusive, the drill steel or bar 79 has an annular collar 80 formed thereon, the under-surface 81 of which contacts with the upper end 82 of the detachable bit 70 to provide the impact transmitting contact between the bar or steel 79 and the bit 70.

In Fig. 24, the detachable bit 70' is identical in construction with the bit 70 including the depressions or recesses 73' and the grooves or slots 75' as well as the other features of the bit 70. This construction differing from the construction in Figs. 19 to 22 in the arrangement of the impact transmitting contacting surfaces.

The steel or bar 79 is inserted all of the way into the socket 72' so that its inner end 85 contacts with the inner end 86 of the socket to provide the impact transmitting contact of the bar and bit. In all other respects with the exception of the annular collar 80, the steel or bar 79' is like the steel or bar 79, having lugs 77' thereon which are like the lugs 77.

While the construction shown in Figs. 10 to 13, inclusive, namely the structure wherein the socket is formed on the drill steel or bar with the shank formed on the drill bit, shows only the method of construction comprising the annular helical shoulders, it is to be understood that the annular helical groove feature such as disclosed in Figs. 14 to 18 inclusive or the eccentric depression and lug structure for connecting the bit and shank as shown in views 19 to 24 inclusive, may be applied to the structures wherein the shank is formed upon the bit and the socket upon the bar without departing from the spirit of the present invention, and also it is to be understood that any of the various arrangements of connecting the bit and shank may be embodied in any of the various constructions of bit and shank, without departing from the spirit of the present invention.

It will be understood that the invention is not to be limited to the specific construction or arrangement of parts shown but that they may be widely modified within the invention defined by the claims.

What is claimed is:

1. In a detachable drill bit, in combination, a drill bit for attachment to a shank having cutting edges on one end and provided with an axial socket extending inwardly from the other end, portions of said drill bit about said socket being pressed inwardly for a predetermined distance from the mouth of the socket to form an annular shoulder within the socket, certain spaced portions of the bit being left in their normal positions to form grooves extending longitudinally into the socket and interrupting said shoulder, a shank, a plurality of circumferentially spaced projections on said shank for engagement beneath said shoulder, one of said grooves being wider than the remaining grooves, one of said projections being wider than the other spaced projections, and a collar on said shank for engagement with the outer end of said bit to provide impact transmitting contact between the shank and bit.

2. In a detachable drill bit, the combination of a socket member having a socket therein, a helical shoulder in said socket, a shank for insertion into the socket, circumferentially spaced projections on said shank being located longitudinally of the shank in such positions as each to have contact only with a respective portion of said helical shoulder, said socket member having longitudinally extending grooves therein opening out inwardly of said shoulder to permit insertion of said projections into the socket for engagement against the shoulder, one of said grooves being larger than the others and one of said projections being wider than the other projections so as to insure the proper positioning of the socket and shank when connected, a collar on said shank for engagement with the outer end of said bit to provide impact transmitting contact between the shank and bit, the engaging edges of said helical shoulder and said projections being cut at acute angles to the angles of the engaging faces of the collar and shank.

CHARLES A. HIRSCHBERG.